United States Patent
Helm

(10) Patent No.: US 8,915,507 B2
(45) Date of Patent: Dec. 23, 2014

(54) RIGID AXLE WITH AIR SUSPENSION

(71) Applicant: ZF Friedrichshafen AG, Friedrichshafen (DE)

(72) Inventor: Eike Helm, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/357,019

(22) PCT Filed: Oct. 17, 2012

(86) PCT No.: PCT/EP2012/070585
§ 371 (c)(1),
(2), (4) Date: May 8, 2014

(87) PCT Pub. No.: WO2013/072152
PCT Pub. Date: May 23, 2013

(65) Prior Publication Data
US 2014/0306416 A1    Oct. 16, 2014

(30) Foreign Application Priority Data
Nov. 17, 2011    (DE) .......................... 10 2011 086 517

(51) Int. Cl.
*B60G 9/02*    (2006.01)
*B60G 11/27*    (2006.01)
*B60G 11/28*    (2006.01)

(52) U.S. Cl.
CPC ...................................... *B60G 11/28* (2013.01)
USPC ....... 280/124.128; 280/124.116; 280/124.157

(58) Field of Classification Search
CPC .. B60G 9/003; B60G 11/27; B60G 2300/026; B60G 2202/152; B60G 2200/314; B60G 2204/1226; B60G 2204/129; B60G 2204/128; B60G 2206/30

USPC ..................... 280/124.116, 124.128, 124.157
See application file for complete search history.

(56) References Cited

U.S. PATENT DOCUMENTS

| 4,714,269 | A | * | 12/1987 | Raidel | ........................... 280/683 |
| 6,375,203 | B1 | * | 4/2002 | Warinner et al. | ............. 280/81.6 |

(Continued)

FOREIGN PATENT DOCUMENTS

| CA | 2 147 555 C | * | 3/2004 |
| CH | 381102 | | 9/1964 |

(Continued)

OTHER PUBLICATIONS

German Search Report Corresponding to 10 2011 086 517.9 mailed Oct. 9, 2012.

(Continued)

*Primary Examiner* — Ruth Ilan
(74) *Attorney, Agent, or Firm* — Davis & Bujold, PLLC; Michael J. Bujold

(57) ABSTRACT

A rigid axle with direct air suspension, preferably for a commercial vehicle. The rigid axle includes an axle body, trailing arms, air springs and vibration dampers. The rigid axle is characterized in that a contact point of the vibration damper, on the axle side, is arranged on the trailing arm. The arrangement of the vibration damper parallel to the direction in which the axle is deflected provides both space and weight savings, without the necessity of arranging elaborately constructed and weight-increasing additional devices in the area of the axle body or the chassis and allows light and slim vibration dampers to be used, and eliminates undesirable horizontally-acting force components of the damping force.

15 Claims, 3 Drawing Sheets

(56) References Cited

U.S. PATENT DOCUMENTS

| | | | |
|---|---|---|---|
| 6,959,932 B2 * | 11/2005 | Svartz et al. | 280/5.514 |
| 2003/0038471 A1 * | 2/2003 | Svartz et al. | 280/789 |
| 2004/0084860 A1 | 5/2004 | Svartz et al. | |
| 2004/0232646 A1 * | 11/2004 | Peters et al. | 280/124.132 |
| 2005/0173883 A1 | 8/2005 | Mayenburg et al. | |
| 2008/0067771 A1 | 3/2008 | Varela et al. | |
| 2008/0084047 A1 * | 4/2008 | Bluff et al. | 280/423.1 |
| 2008/0252031 A1 * | 10/2008 | Dudding et al. | 280/124.116 |
| 2011/0001350 A1 | 1/2011 | Schmitz et al. | |
| 2013/0270789 A1 * | 10/2013 | Fowler et al. | 280/124.116 |

FOREIGN PATENT DOCUMENTS

| | | |
|---|---|---|
| DE | 103 34 156 A1 | 2/2005 |
| DE | 103 51 465 A1 | 6/2005 |
| FR | 2 529 838 A1 | 1/1984 |
| WO | WO 2008/094072 A1 * | 8/2008 |
| WO | 2009/053491 A1 | 4/2009 |

OTHER PUBLICATIONS

International Search Report Corresponding to PCT/EP2012/070585 mailed Feb. 21, 2013.

Written Opinion Corresponding to PCT/EP2012/070585 mailed Feb. 21, 2013.

* cited by examiner

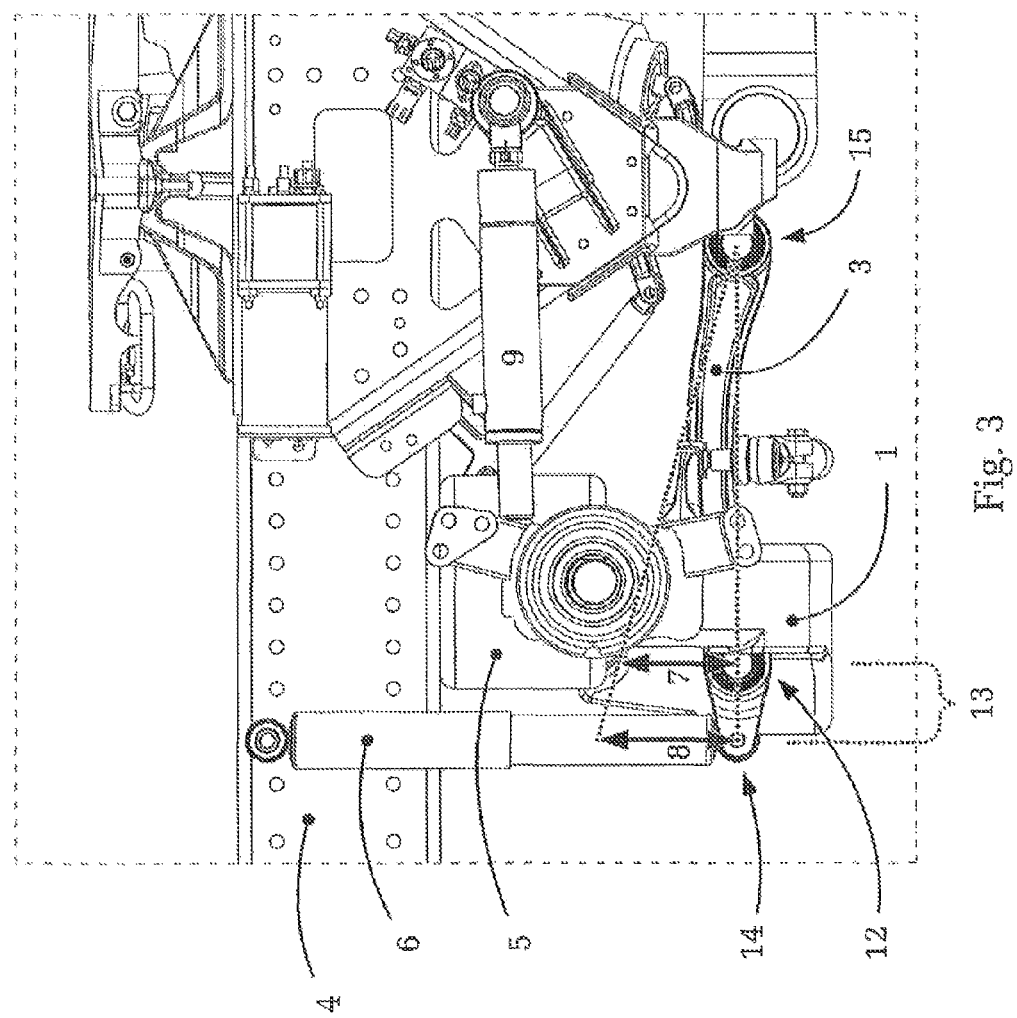

RIGID AXLE WITH AIR SUSPENSION

This application is a National Stage completion of PCT/EP2012/070585 filed Oct. 17, 2012, which claims priority from German patent application serial no. 10 2011 086 517.9 filed Nov. 17, 2011.

FIELD OF THE INVENTION

The invention relates to a rigid axle with direct air suspension.

BACKGROUND OF THE INVENTION

In the case of rigid axles having direct air suspension, for example air-suspended rear axles on trucks, the bellows of the air suspension are arranged directly, thus immediately between the axle body of the rigid axle and a corresponding bellows receptacle on the vehicle chassis (for example on the frame longitudinal beam). Here, the bellows, due to the large volume thereof and the thusly associated large outer diameter, take up significant installation space between the axle body and the frame longitudinal beam.

For vibration damping, conventional rigid axles require at least one vibration damper on each side between the axle and the chassis, in addition to the spring elements formed by the bellows of the air suspension. The respective vibration damper is preferably arranged in the same region between the axle body and the chassis as the respective spring element of the axle, thus presently the bellows of the air suspension. Generally the vibration damper is arranged as far outside on the axle as possibly desired, in order to convert the deflection movements of the axle, or respectively the wheels, in a proportion as close to 1:1 as possible into corresponding damping movements of the vibration damper. Furthermore, for this purpose the vibration damper is ideally arranged parallel to the vertical axis of the vehicle.

However, this desirable arrangement of the vibration damper is problematic due to the large dimensions, or diameters, of the bellows of the air suspension because the respective air spring already takes up the greater part of installation space between the axle body and the chassis. With conventional air-sprung rigid axles it is therefore necessary to guide the vibration dampers past the air spring in a suitable manner.

Solutions are known for this purpose in which the vibration damper is fastened to the axle body and is guided obliquely past the air spring in the direction towards the corresponding vibration damper-fastening on the chassis. However the oblique passing of the vibration damper past the air spring leads to a strong tilting of the vibration damper—the vibration damper is not arranged parallel, but rather at an acute angle to the vertical axis. This degrades the efficiency of the vibration damper because the geometrically dependent damping path of the vibration damper (due to the tilting thereof) that is induced by the deflection movements of the wheel, or, respectively, the axle, is inevitably smaller than the respective deflection path of the wheel, or, respectively, the axle.

This means that more massive or stronger vibration dampers must be employed in order to maintain the same damping effect that would be offered by a slimmer vibration damper, which would be arranged substantially parallel to the deflection path, or, respectively, parallel to the air spring.

Other known proposals for solving the installation space problem between the air spring and the vibration damper consist in offsetting in parallel either the vibration damper or the air spring so that the vibration damper can be arranged in this manner either parallel to the deflection path, or, respectively, parallel to the air spring. Both, the measure of the parallel relocation of the vibration damper next to the air spring, as well as, alternative to this, the displacement of the air spring itself, is however constructively complicated and requires significant disadvantageous additional accommodations for the displaced vibration damper, or, respectively, the displaced air spring, which must be arranged on the axle body.

SUMMARY OF THE INVENTION

Based on this background, the problem addressed by the present invention is to create a rigid axle with direct air suspension, with which the arrangement of the vibration damper allows an optimal efficiency of the vibration damper, in that the deflection movements of the wheel, or, respectively, axle, are transferred to the vibration damper, as close as possible to a ratio of 1:1.

The invention relates to a rigid axle with direct air suspension, particularly for a commercial vehicle. The rigid axle comprises an axle body suspended on the trailing arms, and air springs and vibration dampers. Here, the rigid axle is characterized in that the axle-side contact point of the vibration damper is arranged on the trailing arm.

In the context of the invention the term "direct air suspension" is an arrangement of the air springs directly (thus in a straight line corresponding to the deflection direction) between the axle body of the rigid axle and the vehicle chassis, in other words, an arrangement of the air springs on the vehicle directly vertically above the axle body of the rigid axle.

The rigid axle is designed in most cases such that at least a trailing arm, an air spring and a vibration damper are arranged on each side of the vehicle.

By arranging the axle-side contact point of the vibration damper on the trailing arm, the possibility to move the vibration damper parallel with respect to the air spring arises, and thus to keep the longitudinal axis of the vibration damper parallel to the deflection direction of the wheel, or the axle, respectively. Thus, the vibration damper, with the longitudinal axis thereof, runs nearly parallel, in particular parallel to the vertical axis of the vehicle.

Here however, in contrast to the prior art, no additional retention is necessary on the axle body for the axle-side contact point of the vibration damper, which would be constructively elaborate, and would increase the unsuspended mass of the axle. Rather, with the invention, the otherwise present trailing arm takes on the task of receiving and bearing the axle-side contact point of the vibration damper. Thus, no additional components or assemblies are necessary for accommodating the vibration damper, and at most a marginal increase in the weight of the unsuspended mass of the axle arises, in that the existing trailing arm is reconfigured for accommodating the vibration damper.

The invention is initially implemented independent of where the axle-side contact point of the vibration damper occurs on the trailing arm. Thus, the vibration damper can contact within the longitudinal region of the trailing arm between the two bearing points of the trailing arm, so long as a substantially parallel alignment of the vibration damper to the deflection direction or to the air spring can be maintained.

However, according to a particularly preferred embodiment of the invention, the trailing arm has an extension beyond the axle-side bearing point thereof. Here, the axle-side contact point of the vibration damper is formed by the extension of the trailing arm.

This embodiment is particularly advantageous insofar as a proportional, geometrically dependent enlargement of the damping path occurring at the damper, relative to the deflection path, arises in this manner, due to the extension of the trailing arm beyond the axle-side bearing point thereof. Because in this manner, during deflection, the damper travels an even greater path than the air spring, a correspondingly lighter, or slimmer, dimensioned vibration damper can be used with the same damping effect.

Preferably here, the extension of the trailing arm is designed as a fork-shaped bearing retainer. In this manner, the axle side bearing eye of the vibration damper can be arranged directly in the fork-shaped bearing retainer of the trailing arm, and can be connected to the trailing arm, for example by means of a bolt, whereby a particularly cost-effective and weight-saving implementation of the axle side damper retainer results.

In a further embodiment of the invention, the axle body has a penetration or a recess, wherein the trailing arm penetrates the axle body in the recess. This embodiment comes into consideration particularly in the case of rigid axles, in which the axle body is designed as a cast part. Cast axle bodies, compared to an axle body formed as a forged part, typically require a larger cross-section, particularly a larger cross-sectional length along the direction of deflection in order to absorb the loading during driving operation. Here, the recess in the axle body can be arranged particularly in the region of the neutral fiber of the axle body so that the recess has only a minimal adverse effect on the flexural rigidity of the axle body.

Due to the recess, the axle-side bearing of the trailing arm can be arranged also on the side of the axle body facing away from the trailing arm. As a result, the effective length of the trailing arm can be increased at least initially without additional space requirements on the chassis, which is advantageous for the parallel guidance of the axle. In addition, due to this embodiment, the possibly present extension of the trailing arm beyond the axle-side bearing point thereof, which in this case forms the axle-side contact point of the vibration damper, can also be arranged, without problems, on the other side of the axle body, without requiring a complicated form of the axle body and/or the trailing arm that would be disadvantageous for the power flow.

According to a preferred further design of the invention, the rigid axle is a front axle or steerable leading axle. The latter typically forms a tandem axle together with a driven, non-steered rear axle, wherein the leading axle can also possibly be designed to be liftable, for further reducing fuel consumption and tire wear. In the case of front axles, or steerable leading axles, the installation space in the region of the air spring and vibration damper is even more limited because additional pivotable wheel carriers, steering arms, steering hydraulics and tie rods must also be arranged here.

Here too, there are advantages due to the rigid axle according to the invention, in which the axle-side contact point of the vibration damper is arranged in a particularly installation space-saving and compact manner on the trailing arm, whereby in addition, the vibration damper can also be arranged very close to the air spring and thus in a space-saving manner.

BRIEF DESCRIPTION OF THE DRAWINGS

The invention is explained below in greater detail with reference to drawings that merely depict examples of embodiments. The drawings show:

FIG. 3: the rigid axle according to FIG. 2 in a side view similar to FIG. 1.

DETAILED DESCRIPTION OF THE PREFERRED EMBODIMENTS

Figure 1:
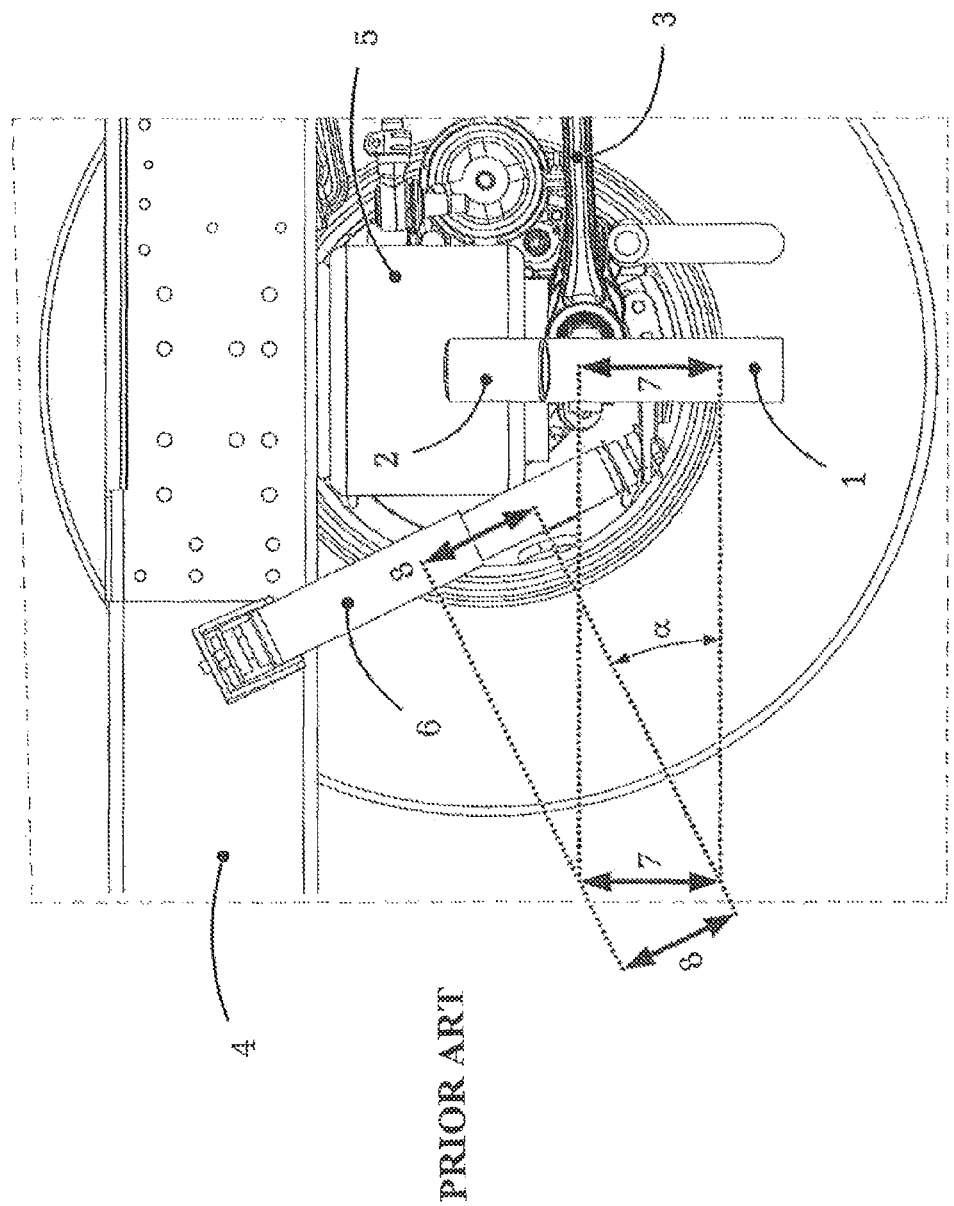
FIG. 1: a side view of an air-sprung rigid axle with a vibration damper according to the prior art.

To begin with, FIG. 1 shows a direct air-sprung steerable rigid axle according to the prior art. The axle body 1 with the bearing retainer 2 arranged thereupon for the kingpin of the steerable wheel carrier (not shown) can be recognized, and a trailing arm 3 for guiding the axle body 1. An air spring 5, which spring-supports the axle body 1 with respect to the chassis 4, is arranged directly between the axle body 1 and the vehicle chassis 4.

The axle shown has a vibration damper 6 on each side of the vehicle for vibration damping between the unsprung masses of the axle and the vehicle. In the case of the represented prior art, the vibration damper 6 must be arranged at an acute angle between the axle and the chassis in order to prevent collision with the air spring 5, because in principle this has a larger diameter.

Due to the angled placement of the vibration damper 6, the deflection movements 7 of the axle body 1 are transferred nearly proportionally to the vibration damper 6 in the form of damper movements 8. Here however the damper movements 8, geometrically dependent on the cosine of the angled placement α of the vibration damper 6, are smaller than the deflection movements 7 of the axle, as shown in FIG. 1 by the indicated dotted reference lines.

Because the vibration damper 6 must bring about the necessary damping effect in this manner on a smaller path 8, for which there would be a larger path 7 available for a vibration damper arranged parallel to the deflection direction (vertical with respect to the drawing), the vibration damper 6 must correspondingly generate greater damping forces in order to effect the same vibration damping as a vertically arranged vibration damper. This means that the vibration damper 6 in the case of the prior art must be dimensioned correspondingly stronger, and thus heavier and with a greater volume.

Additionally, the horizontal component of the damping force arising from the angled arrangement of the vibration damper 6 is undesired, and unnecessarily loads the axle, or the suspension thereof by means of the trailing arms 3.

Figure 2:
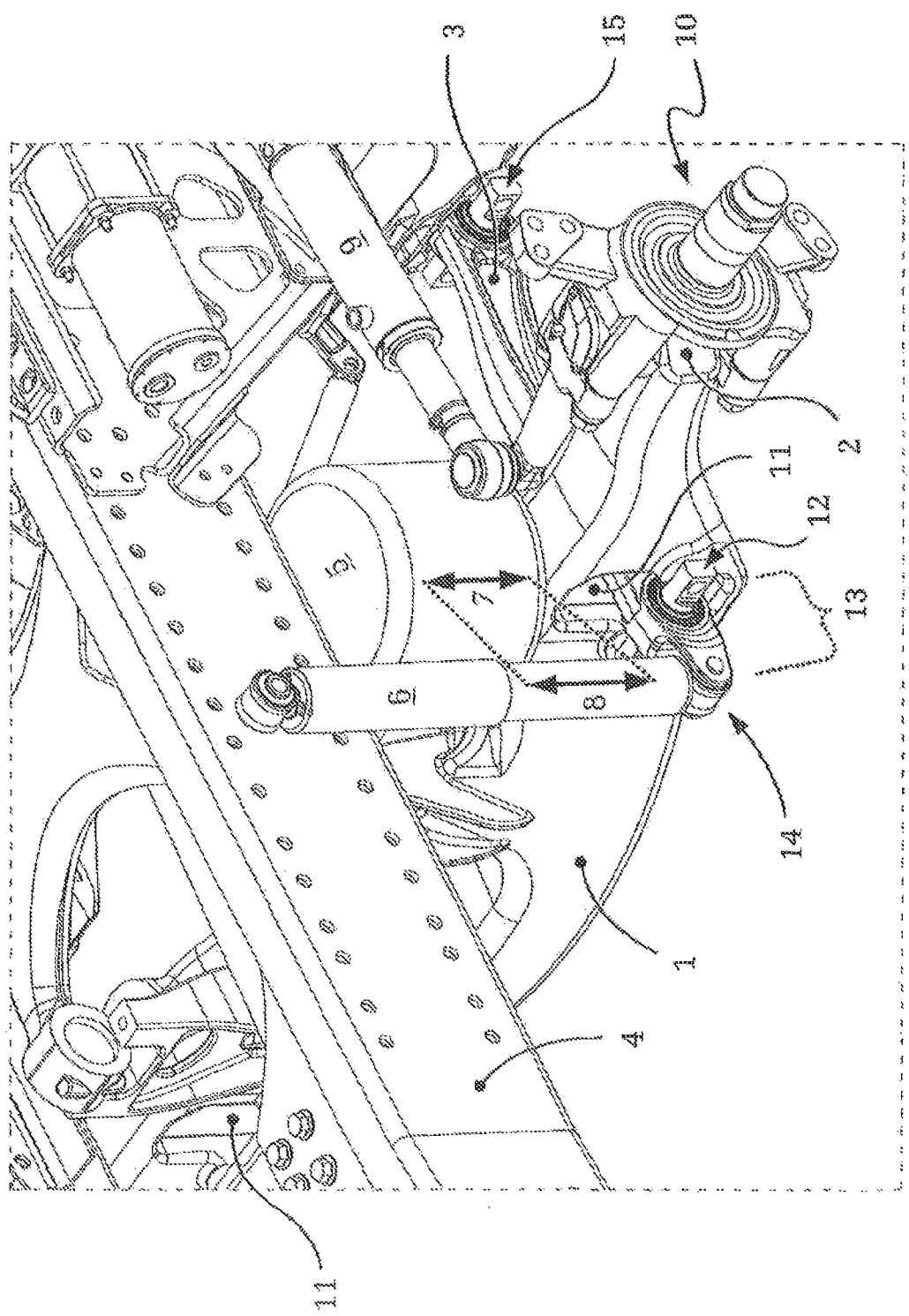
FIG. 2: an isometric representation of an air-sprung rigid axle according to one embodiment of the present invention.

FIG. 2 shows a directly suspended rigid axle according to one embodiment of the present invention, here in an isometric representation. One of the axles shown is a steerable leading axle which, together with a driven (not shown) rear axle, forms a tandem axle. Here again, the axle body 1 (implemented here as a cast part) with the bearing retainer 2 for the wheel support 10, steerable by means of steering hydraulics 9, and the air spring 5, which here again is arranged directly above the axle body 1 between the axle body 1 and the chassis 4, can be recognized.

In addition, the axle body 1 is again connected to the chassis 4 by means of the trailing arms 3. In the represented embodiment of the axle body 1, the trailing arms 3 penetrate through the axle body 1 in corresponding recesses 11, whereby the axle-side bearing points 12 of the trailing arms 3 can be arranged at the axle body 1 beyond the length of the trailing arms 3 effective for the guidance of the axle (left of the axle body 1 with respect to the drawing). In this manner, the effective length of the trailing arms 3 is initially enlarged, (effectively without additional installation space requirements), which benefits the axle guidance and thus the deflection behavior and handling performance.

Additionally, as a result of this, the linkage of the axle-side end of the vibration damper 6 is possible in a region of an extension 13 arranged on the trailing arm 3. The end of the extension 13 of the trailing arm 3 is formed fork-shaped for the purpose of receiving the axle-side bearing 14 of the vibration damper 6. Due to the extension 13 of the trailing arm 3 it is possible to arrange the axle-side bearing 14 of the vibration damper 6 with an appropriate horizontal distance 13 from the axle body 1 (or from the axle-side bearing 12 of the trailing arm 3), so that the vibration damper 6 can be arranged vertically with respect to the vehicle, and parallel to the deflection direction, and aligned parallel to the arrangement of the air spring 5.

This means that the damping path 8 of the vibration damper is no longer smaller (as with the prior art, compare FIG. 1) than the deflection path 7 of the air spring 5, or the axle 1, but rather at least the same size as the deflection path 7 of the axle. Due to the linkage of the axle body 1 to the chassis 4 via the trailing arm 3, whereby the axle-side bearing 12 of the trailing arm 3 is guided during deflection along a circular line about the chassis-side bearing 15 of the trailing arm 3, the damping path 8 of the vibration damper 6 is proportionally even larger by the percentage of the additional length 13 of the trailing arm 3, which corresponds to the additional length 13 of the trailing arm 3 with respect to the length of the trailing arm 3 between the chassis-side bearing 15 and the axle-side bearing 12 of the axle body 1.

This means that the vibration damper 6 in this embodiment of the rigid axle according to the invention traverses an even larger damping path 8 than that corresponding to the deflection movement 7 of the axle 1. Hereby the damping forces to be provided by the damper are reduced, whereby a vibration damper 6 that is correspondingly slimmer and thus saving installation space and weight, can be used.

FIG. 3 again shows the embodiment of the rigid axle according to FIG. 2 in a side view corresponding to FIG. 1. Again, the axle support 1, a trailing arm 3, the chassis 4, an air spring 5 and a vibration damper 6 can be seen. Also seen in FIG. 3 is how the trailing arm 3 penetrates the axle body 1 (compare also FIG. 2 with the recess 11) and forms the extension 13 for accommodating the axle-side bearing point 14 of the vibration damper 6 beyond the axle body 1.

Because, during deflection movements 7 of the axle 1, the trailing arm 3 describes a circular pivot movement around the bearing point 15 fixed to the chassis, there results a proportional enlargement of the damping path 8 the vibration damper 6 travels during a deflection movement 7 that corresponds to the extension 13 of the trailing arm 3.

In other words this means that the damping path 8 with the represented embodiment of the invention is significantly larger than the deflection path 7 of the axle, whereby a correspondingly significantly slimmer-dimensioned vibration damper 6 can be used.

Thus, due to the invention, an overall compact space-saving arrangement of the axle body 1, trailing arm 3, air spring 5 and vibration damper 6 results, and at the same time, a more efficient, installation space and weight saving design of the vibration damper 6. In addition, the horizontal acting force components of the damping force that are present in the prior art (see FIG. 1) no longer exist, whereby in particular the bearing points 12, 15 of the trailing arms 3 are additionally relieved of load.

REFERENCE CHARACTERS 1 axle, axle body
2 kingpin—bearing retainer
3 trailing arm
4 chassis
5 air spring
6 vibration damper
7 deflection path (axle)
8 damping path (vibration damper)
9 hydraulic steering system
10 wheel carrier
11 recess
12 bearing point (trailing arm)
13 arm extension, horizontal distance
14 bearing point (vibration damper)
15 bearing point (trailing arm)

The invention claimed is:

1. A rigid axle with direct air suspension for a commercial vehicle, the rigid axle comprising:
   an axle body (1),
   a trailing arm (3),
   an air spring (5),
   at least one vibration damper (6),
   an axle-side contact point (14) of the at least one vibration damper (6) being arranged on the trailing arm (3), and
   the axle body (1) having a recess (11), and the trailing arm (3) penetrating through the recess (11) of the axle body (1).

2. The rigid axle according to claim 1, wherein the trailing arm (3) has an extension (13), beyond an axle-side bearing point (12) thereof, and the axle-side contact point (14) of the vibration damper (6) is formed by the extension (13) of the trailing arm (3).

3. The rigid axle according to claim 2, wherein the extension (13) of the trailing arm (3) is formed as a fork-shaped bearing retainer.

4. The rigid axle according to claim 1, wherein the vibration damper and the air spring are arranged substantially parallel to one another.

5. The rigid axle according to claim 4, wherein the vibration damper and the air spring are arranged substantially parallel to a vertical axis of the commercial vehicle.

6. The rigid axle according to claim 1, wherein the rigid axle is one of a front axle and a steerable leading axle.

7. A rigid axle with direct air suspension for a commercial vehicle, the rigid axle comprising:
   an axle body having a bearing retainer which pivotally supports a wheel carrier communicating with a steering mechanism,
   an air spring which supports the axle body with respect to a chassis of the vehicle, and the air spring being arranged between the axle body and the chassis,
   a trailing arm having a damper bearing point at one end thereof and a chassis bearing point at an opposite end thereof that is fixed to the chassis such that the trailing arm is pivotable with respect to the chassis,
   a vibration damper being coupled, adjacent a first end, to the chassis and being coupled, adjacent a second end, to the trailing arm via the damper bearing point of the trailing arm, and
   the axle body having a recess, and the trailing arm extending through the recess of the axle body.

8. The rigid axle according to claim 7, wherein the trailing arm has an extension, beyond an axle-side bearing point thereof, and the axle-side contact point of the vibration damper is formed by the extension of the trailing arm.

9. The rigid axle according to claim 8, wherein the extension of the trailing arm is formed as a fork-shaped bearing retainer.

10. The rigid axle according to claim 7, wherein the vibration damper and the air spring are arranged substantially parallel to one another.

11. The rigid axle according to claim 10, wherein the vibration damper and the air spring are arranged substantially parallel to a vertical axis of the commercial vehicle.

12. The rigid axle according to claim 7, wherein the rigid axle is one of a front axle and a steerable leading axle.

13. A rigid axle with direct air suspension for a commercial vehicle, the rigid axle comprising:
- an axle body,
- a trailing arm,
- an air spring,
- at least one vibration damper,
- an axle-side contact point of the at least one vibration damper being arranged on the trailing arm,
- the trailing arm having an extension, beyond an axle-side bearing point thereof, and the axle-side contact point of the vibration damper being formed by the extension of the trailing arm,
- the vibration damper and the air spring being arranged substantially parallel to one another and substantially parallel to a vertical axis of the commercial vehicle; and
- the axle body having a recess, and the trailing arm penetrating through the recess of the axle body.

14. The rigid axle according to claim 13, wherein the extension of the trailing arm is formed as a fork-shaped bearing retainer.

15. The rigid axle according to claim 13, wherein the rigid axle is one of a front axle and a steerable leading axle.

* * * * *